June 26, 1962     I. L. AUERBACH     3,041,467
SWITCHING APPARATUS
Filed Nov. 24, 1958
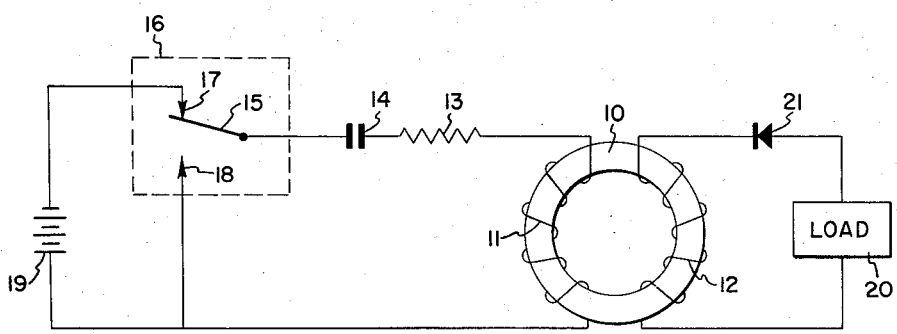
*Fig.1*
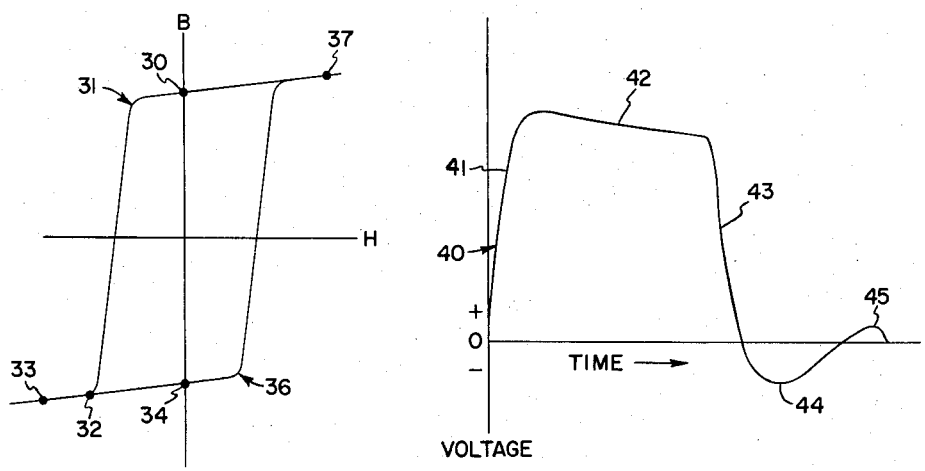
*Fig.2*     *Fig.3*
INVENTOR.
ISAAC L. AUERBACH
BY
ATTORNEY

United States Patent Office 3,041,467
Patented June 26, 1962

3,041,467
SWITCHING APPARATUS
Isaac L. Auerbach, Philadelphia, Pa., assignor to Minneapolis-Honeywell Regulator Company, Minneapolis, Minn., a corporation of Delaware
Filed Nov. 24, 1958, Ser. No. 776,020
2 Claims. (Cl. 307—88)

The present invention is directed to a switching arrangement for driving a saturable magnetic core member from one state of remanence to another state of remanence to thereby provide a useful output signal.

Specifically, the present invention is directed to a switching arrangement as above set forth which requires no electronic components with continuous standby power requirements. Electronic components of this type accentuate the reliability problem and the power drain resulting therefrom introduces the problem of dissipating the heat which arises as a result and especially is this true in such applications as computers and calculators wherein signals such as are produced by devices of the general type set forth herein are utilized.

Further, the present invention is directed to a switching arrangement as set forth above which is selectively operable and which requires but a single winding on the core member to drive the core member from a first state of remanence to another state of remanence.

As disclosed herein, a simple arrangement is set forth which essentially includes a saturable magnetic core member with an input winding and an output winding disposed thereon. A rectifier is placed in series with the output winding. A selectively operable switch, energy storage means, and a source of direct current voltage are associated with the input winding. The foregoing elements are connected so that with the switch in a first condition the source of voltage is connected in a first series circuit with the energy storage means and the input winding. With the switch in a second condition, the source of voltage is placed in open circuit while the energy storage means and the input winding are connected in a second series circuit. Assuming the core member to be in a particular state of remanence, such as a first state of saturation, and with a charge on the energy storage means and with the voltage source appropriately connected, actuation of the switch from the first to the second condition results in the discharge of the energy storage means through the input winding with a consequent input signal pulse arising thereacross which is of such a polarity as to drive the core member to another state of remanence, such as a second state of saturation. The driving of the magnetic core member from one state of saturation to the other results in an output signal pulse to be induced in the output winding and due to the manner in which the rectifier is connected to the output winding, the output signal pulse is allowed to pass to a suitable load. Upon subsequent deactuation of the switch from the second to the first condition, the energy storage means is charged and a reverse input signal pulse is developed across the input winding which results in the core member being driven to its original state of saturation. The driving of the core member to its original state of saturation causes a signal pulse to be induced in the output winding. However, this output signal pulse is blocked by the rectifier. Subsequent actuation and deactuation of the switch repeates the cycle.

The selectively operable switch utilized can be a common type of snap switch which allows for rapid actuation of the switching arrangement such as by rotating cams, etc. However, utilization of this type of snap action switch by itself results in contact bounce arising upon actuation of the switch. By utilizing energy storage means and magnetic core member in the arrangement, as briefly set forth above, the multiple output signal pulses, which contact bounce would normally introduce in an arrangement not utilizing such energy storage means and magnetic core member, are not realized when the energy storage means is so chosen as to be completely discharged upon actuation of the switch and prior to the first contact bounce. This aspect will be more fully discussed below.

Therefore, it is an object of the present invention to provide a switching arrangement for selectively driving a saturable magnetic core member from one state of remanence to a second state of remanence by means of charging and discharging energy storage means through a single winding on the core member and wherein no electronic components with continuous power drain and heat generation, are utilized.

Another object of the present invention is to provide a switching arrangement as set forth above which utilizes a snap action switch with its inherent contact bounce, but which still results in only a single output signal pulse being obtained from the arrangement upon actuation of the switch.

These and other objects will become more apparent from a reading of the following specification and appended claims in which:

FIGURE 1 is a schematic diagram of a circuit arrangement embodying the invention;

FIGURE 2 is a hysteresis loop diagram for a saturable magnetic core member exhibiting a substantially rectangular hysteresis loop, which type of core member may be utilized in the invention; and FIGURE 3 is a signal pulse form generated in the output winding of the arrangement of FIGURE 1 when utilizing a saturable magnetic core member exhibiting a substantially rectangular hysteresis loop of the type shown in FIGURE 2.

The circuit arrangement shown in FIGURE 1 includes a saturable magnetic core member 10. The core member 10 can be comprised of any saturable material, but in the particular embodiment disclosed herein a molded ferrite or alloy type core member exhibiting a substantially rectangular hysteresis loop of the type shown in FIGURE 2 is utilized. An input winding 11 and an output winding 12 are disposed on the core member 10. A current limiting resistor 13 and energy storage means in the form of a capacitor 14 are arranged in series relation with one extremity of the input winding 11. A switch blade 15 of selectively operable switching means in the form of a common type of snap switch 16, indicated by the dotted lines, is operatively connected to the other extremity of the capacitor 14. The movable switch blade 15 cooperates with normally closed contact 17 and normally open contact 18 of the snap switch 16 to provide two circuits, as will be more fully discussed below. Normally closed contact 17 is associated with one terminal of a direct current voltage source 19. The other terminal of the voltage source 19 is connected to the junction formed between the conductor associated with the normally open contact 18 and the second extremity of the input winding 11. A load 20 and rectifier 21 are connected in series relation across the output winding 12.

In FIGURE 1, the arrangement is shown in its normal condition. Thus, the voltage source 19 is placed across the input winding 11, resistor 13 and capacitor 14, so that the capacitor 14 is charged and the core member 10 is in a first state of remanence. Under this set of conditions, it will be assumed that the core member 10 is in a state of saturation wherein it is at its residual magnetic state represented by point 30 along a first saturation line of the hysteresis loop of FIGURE 2.

Actuation of the switch blade 15 manually, by means of a rotating cam, etc., results in the movement of the switch blade 15 away from the normally closed contact 17 and into engagement with the normally open contact 18. Upon this occurring, the capacitor 14 is discharged through the input winding 11 and the resistor 13 and a signal pulse is developed thereacross. Since the current flow of this signal pulse through the input winding 11 is opposite to that initially provided by the voltage source 19, with the arrangement as shown in FIGURE 1, the core member 10 is driven from its residual state of saturation, as represented by point 30 in FIGURE 2, past the knee of the curve 31 substantially vertically to point 32 and out along a second saturation line to some point 33. Driving of the core member 10 from the state of saturation represented by the point 30 to another state of saturation represented by the point 33 results in a signal pulse being developed across the ouput winding 12, and due to the arrangement of the rectifier 21, this signal pulse is allowed to pass to the load 20.

Some finite time after initial engagement of the normally open contact 18 by the switch blade 15, the switch blade 15 moves or bounces away therefrom. In fact, oscillographs taken of the movement of a snap switch blade upon actuation and deactuation thereof indicate that as many as forty bounces between the switch blade 15 and the normally open contact 18 may arise.

It should be noted that the capacitor 14 and resistor 13 are of such values that upon the actuation of the switch blade 15 from the position shown in FIGURE 1 to that where it engages the normally open contact 18, the capacitor 14 is substantially discharged before the first contact bounce occurs so that the core member 10 tends to assume another state of remanence or residual magnetic state, as represented by point 34 in FIGURE 2. Upon subsequent closure due to contact bounce, very little energy remains for driving the core member 10 from the residual magnetic state, point 34, to some position toward point 33.

Without an arrangement such as discussed above, that is, utilization of the capacitor 14 in conjunction with the input winding 11, and by utilizing an arrangement wherein the core member 10 is driven from one state of saturation to the other state of saturation by merely reversing the connections of the voltage source 19 across the input winding 11 by appropriate switching, each of these bounces would result in the core member 10 returning to the residual magnetic state, represented by point 34 in FIGURE 2, followed by the core member 10 being driven toward point 33 as the switch blade 15 again engages the normally open contact 18. The signal pulses which would arise across the output winding 12 as a result of the contact bounce would be such as could interfere with the normal operation of the load 20, especially if the load were in the form of an electronic counter. Of course, the signal pulse which would arise due to the change in saturation from point 33 to point 34 would be blocked by the rectifier 21. However, the signal pulse which would arise upon the point 33 once more being approached would be fed into the system, inasmuch as the rectifier 20 would pass this signal pulse.

Deactuation of the switch blade 15 results in movement thereof away from the normally open contact 18 and into engagement with the normally closed contact 17, and the arrangement returns to the condition shown in FIGURE 1. Thus, the voltage source 19 is applied to the input winding 11 to drive the core member 10 from its residual magnetic state as represented in FIGURE 2 by point 34 through the knee of the curve 36 through the substantially vertical portion of the curve to some point 37. The capacitor 14 is substantially charged during this portion of the cycle and prior to the first contact bounce. Upon the capacitor 14 becoming charged, the core member 10 returns to its residual magnetic state of saturation represented by point 30 in FIGURE 2. This of course means the core member 10 is in the state of saturation originally considered. This change in saturation from one state to the other, while it results in a signal pulse being produced across the output winding 12, the signal pulse does not appear across the load 20 due to the particular arrangement of the rectifier 21. Again, the problem of contact bounce is encountered, but again, the utilization of the capacitor 14 inhibits extraneous signal pulses from arising, inasmuch as once the capacitor 14 is charged no further signal pulses can be passed to the input winding 11. As was pointed out above, the capacitor 14 is substantially charged prior to the first contact bounce so that little energy is drawn by the capacitor 14 to cause the saturation state of the core member 10 to change from point 30 toward point 37, thereby definitely limiting the extraneous signal pulses encountered upon the saturation state of the core member 10 reverting from some point near point 37 to the residual magnetic state as represented by point 30 upon contact bounce occurring.

Subsequent actuation and deactuation of the switch blade 15 of course results in a repetition of the above described cycle.

The signal pulse 40 shown in FIGURE 3 is representative of that derived across the output winding 12 of a switching arrangement as shown in FIGURE 1 utilizing the following components:

Core member 10 _____ Molded ferrite core with one micro weber of flux.
Input winding 11 _____ 60 turns.
Output winding 12 _____ 17 turns.
Current limiting resistor 13 _____ 130 ohms.
Capacitor 14 _____ 0.01 microfarads.
Voltage source 19 _____ 40 volts.
Output voltage across output winding 12 _____ 10 volts.
Load 20 _____ 1000 ohms.

With an arrangement utilizing components as just set forth, an output signal pulse width of about 1.0 microsecond can be obtained.

The signal pulse 40 shown in FIGURE 3 arises upon actuation of the switch blade 15 and movement thereof from the position shown in FIGURE 1 to the position where it is in engagement with the normally open contact 18, resulting in the discharge of capacitor 14 with the resultant signal pulse across input winding 11 causing the core member 10 to be driven from one state of saturation to the other and thereby generating the signal pulse across output winding 12. Thus, upon actuation of the switch blade 15 as called for above, the leading generally vertical portion 41 of the signal pulse 40 of FIGURE 3 arises prior to the core member 10 being "switched." As the core member 10 is "switched," that is, as the substantially vertical portion of the hysteresis loop of FIGURE 2 is traversed, the capacitor 14 discharges resulting in the generally horizontal portion 42 of the signal pulse 40 of FIGURE 3. After the core member 10 is "switched" and saturation is attained, the trailing portion 43 of the signal pulse 40 of FIGURE 3 occurs and the slope thereof is generally determined by the RC constant of resistor 13 and capacitor 14. Inasmuch as the core member 10 is driven to some saturation point 33 and then returns to the residual magnetic saturation state, point 34, upon disengagement of the normally open contact 18 by the switch blade 15 or upon complete discharge of the capacitor 14, a signal pulse of opposite phase is generated. This is represented by signal pulse 44 located below the Time base. Signal pulse 44 of course is blocked by the rectifier 21. The small signal pulse 45 to the right of the signal pulse 44 is representative of extraneous signals produced by completion of the discharge of capacitor 14 upon contact bounce occurring. Due to their minor magnitude, this type of signal may be filtered out, depending on the sensitivity of the load 20. Further, as was intimated above, by properly choosing the values of capacitor 14 and resistor 13, so that the capacitor is completely discharged prior to the first contact bounce, this type signal may be entirely eliminated.

If a signal pulse were desired upon deactuation of the switch blade 15 rather than on actuation thereof, the voltage source 19 need merely be reversed in the arrangement. Also, if signal pulses of the opposite polarity were desired, the rectifier 21 would merely be reversed in the circuit. Further, if signal pulses were desired both on actuation and deactuation of the switch blade 15, the rectifier 21 could be dispensed with.

With an arrangement as disclosed herein, a signal pulse can be selectively produced by means of a simple switching arrangement through means of a single input winding disposed on a saturable magnetic core member which utilizes the principle of charging and subsequent discharging energy storage means. With such an arrangement snap action switches can be utilized even though contact bounce is encountered and only a single pulse is provided to the output of the arrangement. Further, the switching arrangement provides the above described desirable functions without the utilization of continuous power drain type electronic components and the necessity for coping with problems they introduce.

While the arrangement disclosed herein includes a snap action switch, such could be dispensed with and any appropriate mechanical switching means could be utilized. This may be desirable where manual actuation of the arrangement is desired. Similarly, any saturable magnetic core member may be utilized dependent upon the signal pulse form desired.

There are other variations which can be made in the present invention. Therefore, the scope of the present invention should be determined from the following claims in which, I claim:

1. A switching arrangement for producing unidirectional discrete electrical pulses by actuation of a mechanical switch comprising: a saturable magnetic core member exhibiting a substantially rectangular hysteresis loop; an input winding disposed on said core member; an output winding having a rectifier in series therewith disposed on said core member; a capacitor; a direct current source of voltage; and a mechanical single-pole, double-throw snap switch having sufficient resilience to inherently exhibit contact bounce; circuit connections establishing a first series circuit through said input winding, said capacitor, and said source of voltage when said snap switch is in a first condition in which the pole of said switch is in engagement with said first contact to provide a signal of a first polarity across said input winding and to substantially fully charge said capacitor and to shift said core member from a first state of remanence to a second state of remanence before said pole bounces away from said first contact; circuit connections for establishing a second series circuit through said input winding, said capacitor, and through a second contact and the pole of said switch upon said snap switch attaining a second condition to substantially discharge said capacitor to provide a signal pulse of a second polarity across said input winding and to shift said core member from said second state of remanence to said first state before said pole of said snap switch bounces away from said second contact, said second series circuit being open except when the pole of said switch engages said second contact so that appreciable discharge of said condenser occurs only when said switch is in said second condition; said successive shifts of said core member from one state of remanence to another state of remanence inducing complementary single signal pulses of opposite polarity in said output winding regardless of how many times the switch may bounce the signal pulses of the undesired polarity being effectively blocked by said rectifier.

2. A switching arrangement for producing discrete electrical pulses comprising: a saturable magnetic core member exhibiting a substantially rectangular hysteresis loop and having input and output windings disposed on said core member; a capacitor; a direct current source of voltage; and a mechanical single-pole, double-throw snap switch having sufficient resilience to inherently exhibit contact bounce; circuit connections establishing a first series circuit through said input winding, said capacitor, and said source of voltage when said snap switch is in a first condition in which the pole of said switch is in engagement with said first contact to provide a signal of a first polarity across said input winding and to substantially fully charge said capacitor and to shift said core member from a first state of remanence to a second state of remanence before said pole bounces away from said first contact; circuit connections for establishing a second series circuit through said input winding, said capacitor, and through a second contact and the pole of said switch upon said snap switch attaining a second condition to substantially discharge said capacitor to provide a signal pulse of a second polarity across said input winding and to shift said core member from said second state of remanence to said first state before said pole of said snap switch bounces away from said second contact, said second series circuit being open except when the pole of said switch engages said second contact so that appreciable discharge of said condenser occurs only when said switch is in said second condition; said successive shifts of said core member from one state of remanence to another state of remanence inducing complementary single signal pulses in said output winding regardless of how many times the switch may bounce.

References Cited in the file of this patent
UNITED STATES PATENTS

| | | |
|---|---|---|
| 2,375,609 | Zuhlke | May 8, 1945 |
| 2,713,675 | Schmitt | July 19, 1955 |
| 2,749,451 | Talambiras | June 5, 1956 |
| 2,803,759 | Kreuder | Aug. 20, 1957 |
| 2,832,062 | Tracy | Apr. 22, 1958 |
| 2,847,659 | Kaiser | Aug. 12, 1958 |
| 2,941,089 | Brown | June 14, 1960 |
| 2,962,700 | Horsch | Nov. 29, 1960 |